(12) United States Patent
Tamekuni et al.

(10) Patent No.: US 8,317,406 B2
(45) Date of Patent: Nov. 27, 2012

(54) OPTICAL CONNECTOR

(75) Inventors: Yoshikyo Tamekuni, Yokohama (JP);
Masahiro Shibata, Yokohama (JP);
Yukihiro Yokomachi, Yokohama (JP);
Toshihiko Honma, Yokohama (JP);
Tsutomu Watanabe, Yokohama (JP)

(73) Assignees: Sumitomo Electric Industries, Ltd.,
Osaka-shi, Osaka (JP); SEI Optifrontier Co., Ltd., Yokohama-shi, Kanagawa (JP)

( * ) Notice: Subject to any disclaimer, the term of this patent is extended or adjusted under 35 U.S.C. 154(b) by 267 days.

(21) Appl. No.: 12/920,060

(22) PCT Filed: Dec. 17, 2008

(86) PCT No.: PCT/JP2008/073019
§ 371 (c)(1),
(2), (4) Date: Aug. 27, 2010

(87) PCT Pub. No.: WO2009/107306
PCT Pub. Date: Sep. 3, 2009

(65) Prior Publication Data
US 2011/0008003 A1 Jan. 13, 2011

(30) Foreign Application Priority Data
Feb. 29, 2008 (JP) ................................. 2008-050009

(51) Int. Cl.
*G02B 6/36* (2006.01)
*G02B 6/38* (2006.01)
*G02B 6/255* (2006.01)

(52) U.S. Cl. ............................... 385/72; 385/95; 385/99

(58) Field of Classification Search ..................... 385/53, 385/72–80, 95, 96, 98, 99
See application file for complete search history.

(56) References Cited

U.S. PATENT DOCUMENTS

| 5,201,019 | A | * | 4/1993 | Gallusser et al. | 385/99 |
| 5,499,310 | A | | 3/1996 | Ueda | |
| 5,963,692 | A | * | 10/1999 | Marazzi et al. | 385/80 |
| 6,350,065 | B1 | * | 2/2002 | Arima | 385/95 |

(Continued)

FOREIGN PATENT DOCUMENTS

JP 01-216303 8/1989

(Continued)

*Primary Examiner* — Akm Enayet Ullah
(74) *Attorney, Agent, or Firm* — Drinker Biddle & Reath LLP

(57) ABSTRACT

An optical connector, which is capable of enhancing fittability into a cabinet, or the like on account of compactification and also avoiding problems of an increase of bead loss, a breakage, etc. of an optical fiber, can be provided. In an optical connector 1 that houses a fusion-spliced portion 13, in which a short optical fiber 5 that is fitted previously to an optical connector ferrule 85 and a coated optical fiber 3 are fusion spliced together and holds the fusion-spliced portion 13 therein, one end of a protection sleeve 87 made of the thermal shrinkage material that externally fixes the fusion-spliced portion 13 is coupled to the optical connector ferrule 85. An air escape hole 7ffor escaping an air, which is confined in the protection sleeve 87 when the protection sleeve 87 is thermally shrunk and adhered closely to the optical connector ferrule 85, to the outside is formed in the optical connector ferrule 85.

4 Claims, 13 Drawing Sheets

U.S. PATENT DOCUMENTS

| | | |
|---|---|---|
| 6,437,299 B1 | 8/2002 | Watanabe et al. |
| 6,715,933 B1 * | 4/2004 | Zimmer et al. .................. 385/86 |
| 7,329,049 B2 * | 2/2008 | Meek et al. ...................... 385/55 |
| 7,815,377 B2 * | 10/2010 | Doss et al. ....................... 385/98 |
| 7,934,874 B2 * | 5/2011 | Honma et al. ................... 385/97 |
| 8,047,726 B2 * | 11/2011 | Tamekuni et al. .............. 385/60 |

FOREIGN PATENT DOCUMENTS

| | | |
|---|---|---|
| JP | 06-337325 | 12/1994 |
| JP | 2001-013355 | 1/2001 |
| JP | 2002-082257 | 3/2002 |
| JP | 2008-181026 | 8/2008 |
| JP | 2008-225461 | 9/2008 |

* cited by examiner

OPTICAL CONNECTOR

TECHNICAL FIELD

The present invention relates to an optical connector that houses and holds a fission-spliced portion, in which a short optical fiber that is fitted previously to an optical connector ferrule and a coated optical fiber are fusion spliced together, therein.

BACKGROUND ART

In the private optical cable, or the like, the optical connector must be fitted to the optical fiber cable on the spot.

In the prior art, as one mode of the structures used to connect the optical connector ferrule to the end of the coated optical fiber on the spot, there is the optical connector shown in Patent Literature 1 (see FIG. 13).

In an optical connector 110 shown in Patent Literature 1, a short optical fiber 103 that is fitted in advance to an optical connector ferrule 102, and a coated optical fiber 100 on site are connected by the fusion splicing. Then, the periphery of a fusion-spliced portion 105 is covered with a protection sleeve 101 and is reinforced with it.

Then, a connector housing 121 has such a configuration that this housing can house respective elements from the optical connector ferrule 102 to a part of the coated optical fiber 100 located in the rear of the protection sleeve 101.

Also, the connector housing 121 has a plug frame 122 for housing the optical connector ferrule 102 in a state that its top end is projected, a boot 123 for housing an end portion of the coated optical fiber 100, and a cylindrical stop ring 124 whose one end is fitted into the plug frame 122 and integrated with this plug frame and whose other end is fitted into the boot 123 and integrated with this boot. The optical connector ferrule 102 located in the plug frame 122 is energized to the top end side by a compression coil spring 125. This compression coil spring 125 keeps a contact pressure between the optical connector ferrule 102 and the optical connector ferrule on the opposite-side optical connector within a specified range, while allowing the optical connector ferrule 102 to move back at a time of connecting the connector.

In connecting the coated optical fiber end and the optical connector ferrule in the above optical connector 110, the end portion of the coated optical fiber 100 on site, from which the connector housing is omitted as shown in FIG. 14(a), is inserted previously into the protection sleeve 101 that protects the fusion-spliced portion. Then, respective coatings of the end portion of the short optical fiber 103, which is fitted previously to the optical connector ferrule 102 being held in the plug frame such as the connector, or the like, and the end portion of the coated optical fiber 100 are stripped over a predetermined length. Then, respective stripped end portions are butt connected mutually, and then are fusion spliced together. Then, as shown in FIG. 14(b), the protection sleeve 101 being fitted on the coated optical fiber 100 is moved onto the fusion-spliced portion 105 such that the fusion-spliced portion 105 is covered with the protection sleeve 101 and is brought into a reinforced state. As a result, the optical connector 110 can protect the fusion-spliced portion 105 without fail.

Patent Literature 1: Japanese Patent Application Publication: JP-A-2002-82257

DISCLOSURE OF THE INVENTION

Problems that the Invention is to Solve

However, on account of the alignment and the positioning using the jig, a length of coating-stripped parts 100a, 103a of the end portions of the fusion-spliced optical fibers must be set to about 10 mm in the above connection respectively. Also, in order to cause the protection sleeve 101 to cover surely the coated portion of each optical fiber, a length of the protection sleeve 101 must be set such that the coated portion of each optical fiber and the protection sleeve 101 are overlapped with each other by about 10 mm.

That is, a length of the protection sleeve 101 exceeds 40 mm or more. As a result, the optical connector 110 is extended to exceed L+40 mm that contains a length L of the exposed coated portion of the short optical fiber 103 and a length 40 mm of the protection sleeve 101. In some cases, it is difficult to ensure an enough housing space, and it becomes difficult to install the fusion-spliced portion into a small-sized cabinet, or the like.

Here, it may be considered that, in order to prevent the extension of the optical connector 110, a length dimension of the protection sleeve 101 should be shortened. In this case, the fixed position of the protection sleeve 101 is displaced in the axial direction due to skill difference, wrong work, etc. of the worker on site, and therefore there is a risk that the bare optical fiber is exposed. For this reason, an overlapped length of the protection sleeve 101 onto the coated portion of each coated optical fiber cannot be shortened so much.

Therefore, such a problem still remains that the above approach has little effect on the shortening of the protection sleeve 101, or the like, and also it is difficult to fit the fusion-spliced portion into the cabinet, or the like.

Further, in the case of the above optical connector 110, upon manufacturing the optical connector, the periphery of the fusion-spliced portion 105 is covered with the protection sleeve 101 made of the thermal shrinkage material, while applying the heating to cause the shrinkage. At that time, in some cases an air is confined in the protection sleeve, and bubbles are generated to cause a bending stress in the optical fiber.

It is an object of the present invention to provide an optical connector capable of improving fittability into a small-sized cabinet, or the like and also avoiding problems of an increase of bend loss, a breakage, etc. of an optical fiber.

Means for Solving the Problems

In order to achieve the object, an optical connector according to the present invention is an optical connector for housing and holding a fusion-spliced portion, in which a short optical fiber that is fitted to an optical connector ferrule and a coated optical fiber are fusion spliced together, therein, wherein one end of a protection sleeve made of a thermal shrinkage material, which is slipped onto the short optical fiber and the coated optical fiber and covers a periphery of the fusion-spliced portion, is coupled to the optical connector ferrule, and an air escape hole that is communicated with an inside of the protection sleeve is provided in the optical connector ferrule.

In the optical connector according to the present invention, it is preferable that a top end portion, in which a coating is stripped, of the short optical fiber is inserted into an optical fiber insertion hole of the optical connector ferrule, and a boundary part between the top end portion and the coating is adhered and secured to the optical fiber insertion hole.

In the optical connector according to the present invention, it is preferable that the optical connector ferrule has a ferrule main body, a diameter extended portion which is coupled integrally to the ferrule main body, and a coupling projection which is joined to one end of the diameter-extended portion and onto which the protection sleeve is fitted, and the coating which is stripped from the top end portion and removed from the fusion-spliced portion of the short optical fiber is still left at least in the coupling projection.

ADVANTAGES OF THE INVENTION

According to the optical connector of the present invention, one end of the protection sleeve is coupled to the optical connector ferrule. Therefore, the positioning of the protection sleeve that sets the fusion-spliced portion in the center position is made precisely, irrespective of a degree of skill of the worker on site. As a result, an overlapped length between the end portion of the protection sleeve and the coated portion of the coated optical fiber can be reduced, and thus a length of the optical connector can be made compact by reducing largely a length of the protection sleeve.

Therefore, on account of the compactification of the optical connector, the fittability of the optical connector into the small-sized cabinet, or the like can be improved.

Also, the air escape hole that communicates with the inside of the protection sleeve is provided to the optical connector ferrule to which the protection sleeve is coupled. Therefore, even though an air is confined in the protection sleeve made of the thermal shrinkage material when this protection sleeve is arranged over the fusion-spliced portion and is thermally shrunk, the confined air can be exhausted to the outside through this air escape hole.

As a result, such an event never happens that a bending stress is caused in the optical fiber due to the remaining of bubbles in the protection sleeve.

EXPLANATION OF DESIGNATIONS

1: optical connector, 3: coated optical fiber, 5: short optical fiber, 7a: top end shaft portion (ferrule main body), 7b: diameter-extended portion, 7c: sleeve coupling projection (coupling projection), 7d: optical fiber insertion hole, 7e: hole, 7f: air escape hole, 7g: optical fiber guiding portion, 13: fusion-spliced portion, 25: thermal shrinkage tube, 70: optical cord, 83: plug frame, 85: optical connector ferrule, 87: protection sleeve, 95: boot

BEST MODE FOR CARRYING OUT THE INVENTION

A preferred embodiment of an optical connector according to the present invention will be explained in detail with reference to the drawings hereinafter.

Figure 1:
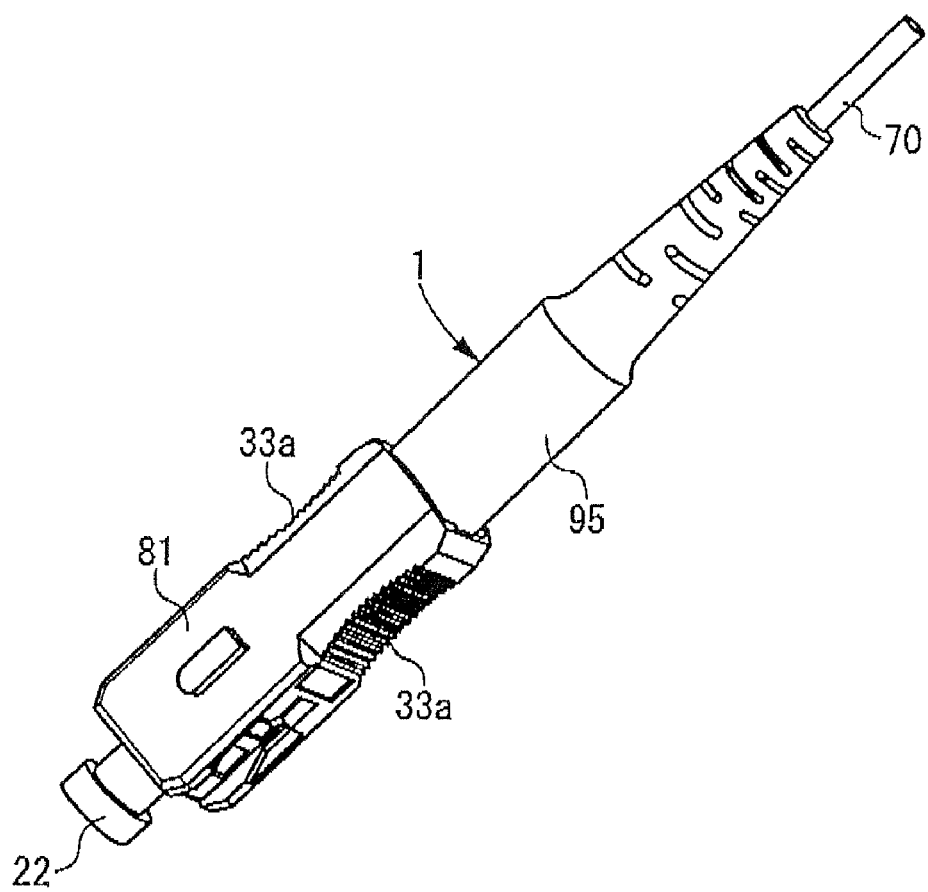
FIG. 1 is a perspective external view of an embodiment of an optical connector according to the present invention.
Figure 2:
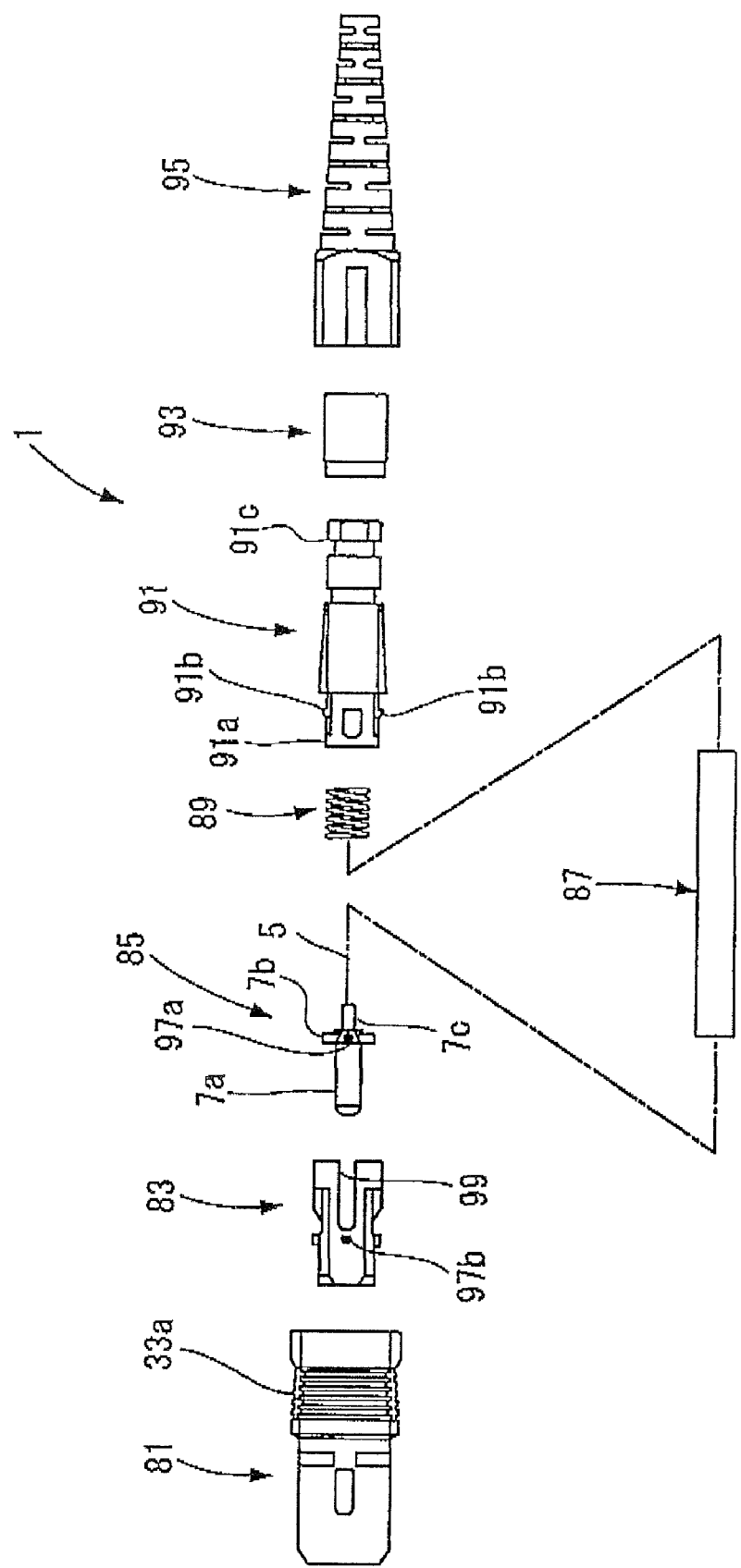
FIG. 2 is an exploded side view of the embodiment of the optical connector according to the present invention.
Figure 3:
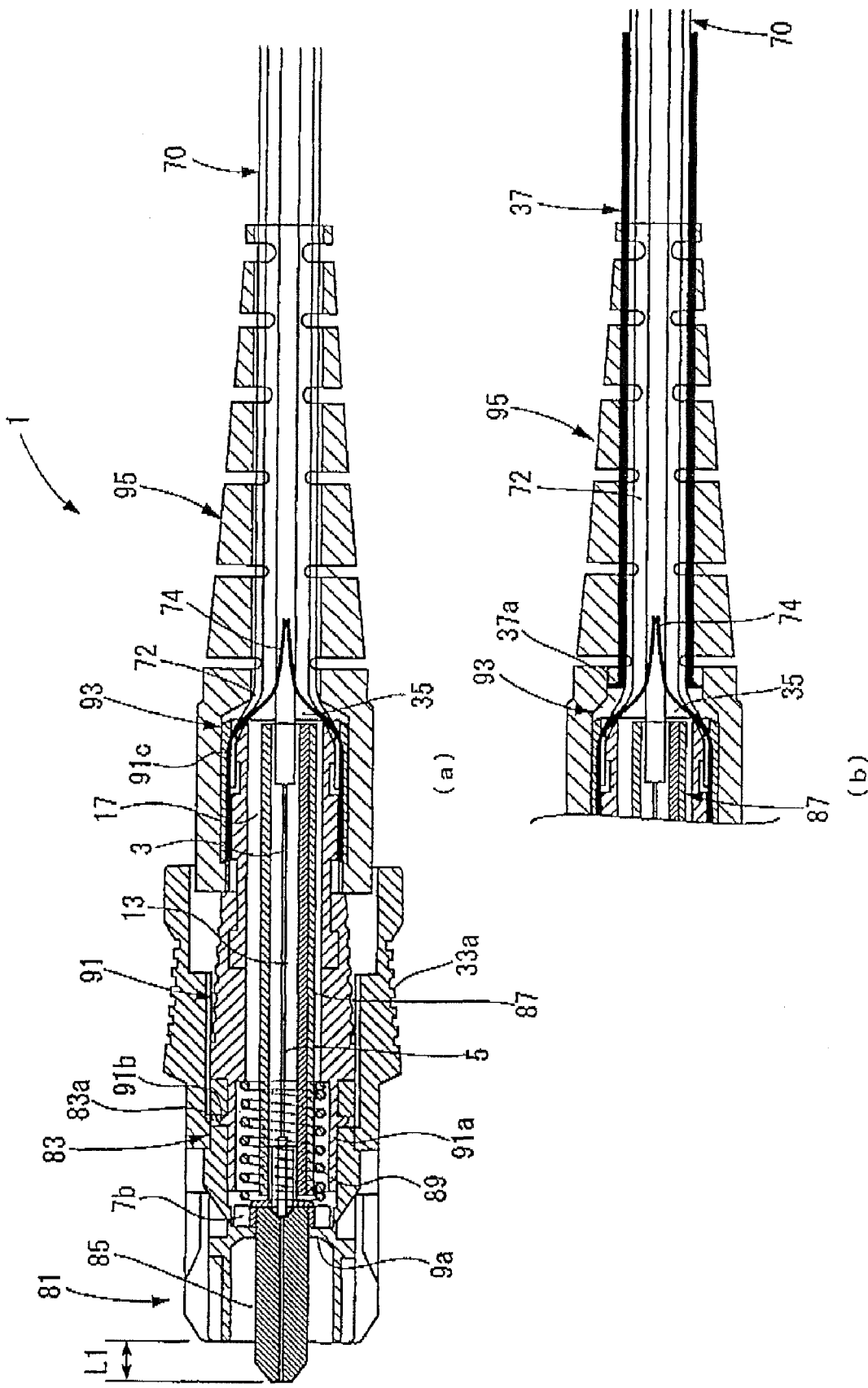
FIG. 3(a) is a longitudinal sectional view of the optical connector shown in FIG. 2.
FIG. 3(b) is a pertinent longitudinal sectional view of a variation in which a reinforcing tube is fitted.
Figure 4:
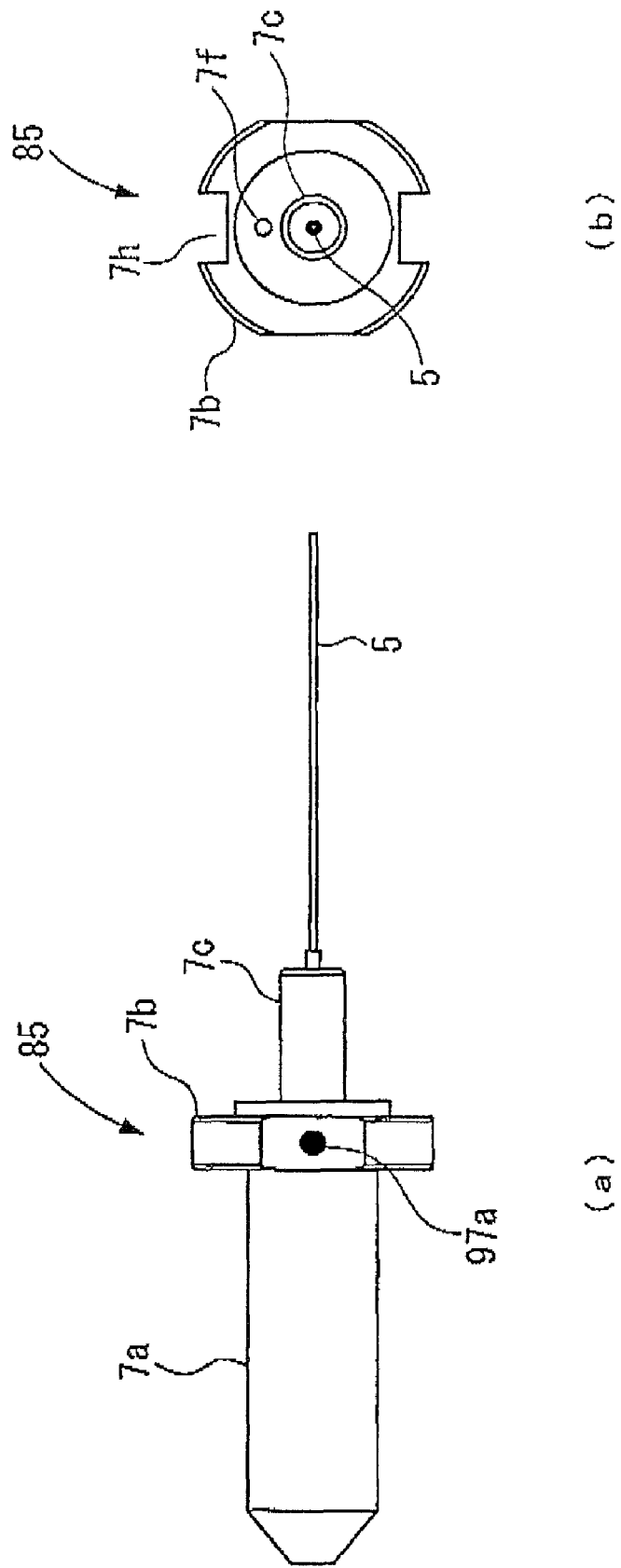
FIG. 4(a) is a side view of an optical connector ferrule.
FIG. 4(b) is a front view of the optical connector ferrule when viewed from the short optical fiber side.
Figure 5:
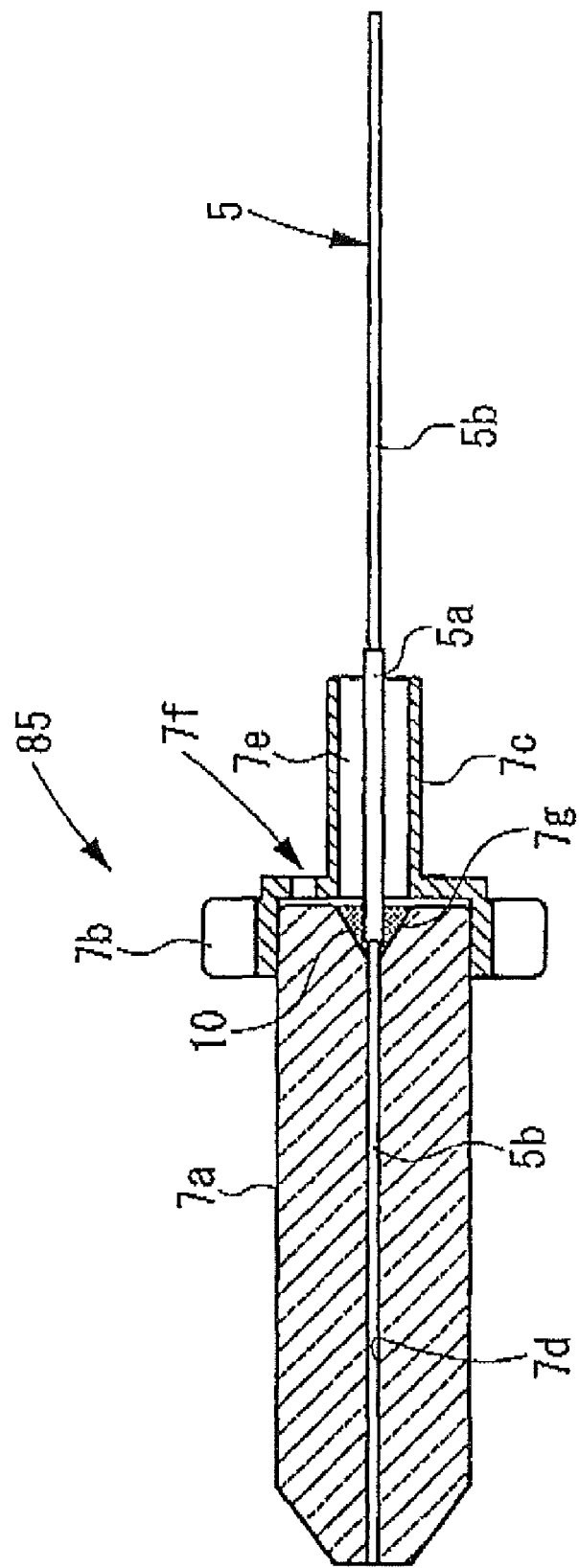
FIG. 5 is a longitudinal sectional view of the optical connector ferrule shown in FIG. 4.

FIG. 1 is a perspective external view of an embodiment of an optical connector according to the present invention, FIG. 2 is an exploded side view of the optical connector shown in FIG. 1, FIG. 3(a) is a longitudinal sectional view of the optical connector shown in FIG. 1, FIG. 3(b) is a pertinent longitudinal sectional view of a variation in which a reinforcing tube is fitted, FIG. 4(a) is a side view of an optical connector ferrule. FIG. 4(b) is a front view of the optical connector ferrule when viewed from the short optical fiber side, and FIG. 5 is a longitudinal sectional view of the optical connector ferrule shown in FIG. 4.

An optical connector of this embodiment can be applied to both the cord type in which an optical cord 70 is connected, and the coated fiber type in which a coated optical fiber 3 is connected. Except that a shape of the SC connector knob described later is slightly different, respective components that are substantially common to those of the cord type optical connecter are employed in the coated fiber type optical connecter. In the following explanation, mainly the cord type optical connecter (referred simply to as the "optical connecter" hereinafter) 1 will be explained.

The optical connector 1 of this embodiment is fitted to an exposed end portion of the coated optical fiber 3, from which a jacket 72 (see FIG. 3) of the optical cord 70 on site is removed by a predetermined length. From its top end side (the left side in FIG. 2) coupled to the opposite side optical connector, this optical connector 1 includes an SC connector knob 81, a plug frame 83, a fiber built-in ferrule (optical connector ferrule) 85, a protection sleeve 87 having thermal shrinkability, a ferrule presser bar spring 89, a rear housing 91, a caulking ring 93, and a boot 95 as principal members.

An outline of the above principal members will be described hereinafter. The plug frame 83 houses and holds the optical connector ferrule 85 to which a short optical fiber 5 is fitted previously. The protection sleeve 87 covers an outer periphery of a fusion-spliced portion 13 (see FIG. 3) of the coated optical fiber 3 and the short optical fiber 5 to protect the fusion-spliced portion 13. The rear housing 91 has an internal space 17 in which the protection sleeve 87 is arranged, and is integrated with the plug frame 83 when its top end is coupled to the plug frame 83. The boot 95 houses the end portion and its neighborhood of the coated optical fiber 3, which is fusion spliced to the short optical fiber 5, to protect the coated optical fiber 3. Also, the boot 95 is integrated with the rear housing 91 when its top end is coupled to a base end of the rear housing 91.

Further, details of the above principal members will be described hereunder. In the optical connector ferrule 85, the short optical fiber 5 is fitted such that its center axis is aligned with a top end shaft portion 7a in such a fashion that a diameter-extended portion 7b whose outer diameter is extended is provided in the rear of the top end shaft portion 7a that is butt connected to the optical connector ferrule on the opposite side. Also, a sleeve coupling projection 7c used to couple the protection sleeve 87 described later is provided on the outer periphery on the base end side from which the short optical fiber 5 of the optical connector ferrule 85 is protruded.

As shown in FIG. 4 and FIG. 5, in the optical connector ferrule 85, the top end shaft portion 7a of the zirconia ferrule acting as a ferrule main body is fitted into a concave portion formed in the diameter-extended portion 7b, and is coupled integrally to the diameter-extended portion 7b. An optical fiber insertion hole 7d as a fine hole into which the short optical fiber 5 is inserted to position is formed in the top end shaft portion (zirconia ferrule) 7a to pass therethrough. A hole 7e whose inner diameter is larger than the optical fiber insertion hole 7d is formed in the sleeve coupling projection 7c to extend to a concave portion of the diameter-extended portion 7b, and is communicated with the optical fiber insertion hole 7d. Also, an air escape hole 7f through which the concave portion of the diameter-extended portion 7b and the outside are communicated mutually is formed in the diameter-extended portion 7b of the optical connector ferrule 85. An optical fiber guiding portion 7g that is shaped into a taper surface to make the insertion of the short optical fiber 5 easy is formed on the fiber introducing side of the optical fiber insertion hole 7d into which the short optical fiber 5 is inserted. Also, as shown in FIG. 4(b), a notched groove 7h is formed in outer edges of the diameter-extended portion 7b in the diameter direction respectively. This notched groove 7h is used to prevent the turning of the ferrule main body and position this ferrule main body at a time of polishing.

The assembly of the above optical connector ferrule 85 is done by inserting the short optical fiber 5 from the rear end side of the optical connector ferrule 85 and then arranging a glass fiber part 5b, which is exposed by striping off a coating 5a on the top end side, in the optical fiber insertion hole 7d. At that time, as shown in FIG. 5, the position of the coating 5a is set in such a way that a top end portion of the coating 5a (a boundary part between the coating 5a and the glass fiber part 5b) is positioned in the optical fiber guiding portion 7g. Then, the short optical fiber 5 is adhered/fixed by injecting an adhesive 10 into the optical fiber insertion hole 7d and the optical fiber guiding portion 7g. In this case, the adhesive 10 is not filled into the hole 7e of the sleeve coupling projection 7c not to adhere/fix the short optical fiber 5. Then, in order to fusion splice the short optical fiber 5 to the coated optical fiber 3 on the opposite site, the coating 5a of the end portion of the short optical fiber 5 extended from the rear end of the optical connector ferrule 85 is stripped off, and whereby the assembly is completed. That is, the coating 5a of the short optical fiber 5 exists at least in the hole 7e of the sleeve coupling projection 7c.

The assembled optical connector ferrule 85 is inserted into an opening of the plug frame 83 on the base end side. At that time, as shown in FIG. 3, the front end of the diameter-extended portion 7b comes in touch with a diameter-reduced portion 9a that is provided to protrude into the inner peripheral area of the plug frame 83, and thus the optical connector ferrule 85 is brought into a state that the its forward movement is restricted. In this state, the position of the optical connector ferrule 85 is restricted in a state that its top end is protruded from the top end of the plug frame 83 merely by a predetermined length L1.

Then, a dust cap 22 is put on the top end of the optical connector ferrule 85 being positioned in the plug frame 83, and is fitted thereto. This dust cap 22 prevents such an event that a dust, and the like adhere to the fiber end surface during the safekeeping, or the like. The illustration of the dust cap 22 is omitted except FIG. 1.

In this case, a mirror polishing is applied in advance to the top end surface of the optical connector ferrule 85, and thus the polishing process on the spot can be omitted.

The ferrule presser bar spring 89 is inserted into the plug frame 83 into which the optical connector ferrule 85 is inserted. The ferrule presser bar spring 89 is formed of a compression coil spring that is put between the rear housing 91, which is engaged with the plug frame 83, and the diameter-extended portion 7b of the optical connector ferrule 85, and is held between them. The ferrule presser bar spring 89 brings the diameter-extended portion 7b of the optical connector ferrule 85 into contact with the diameter-reduced portion 9a of the plug frame 83, and simultaneously supports elastically this diameter-extended portion 7b to move backward.

Figure 6:
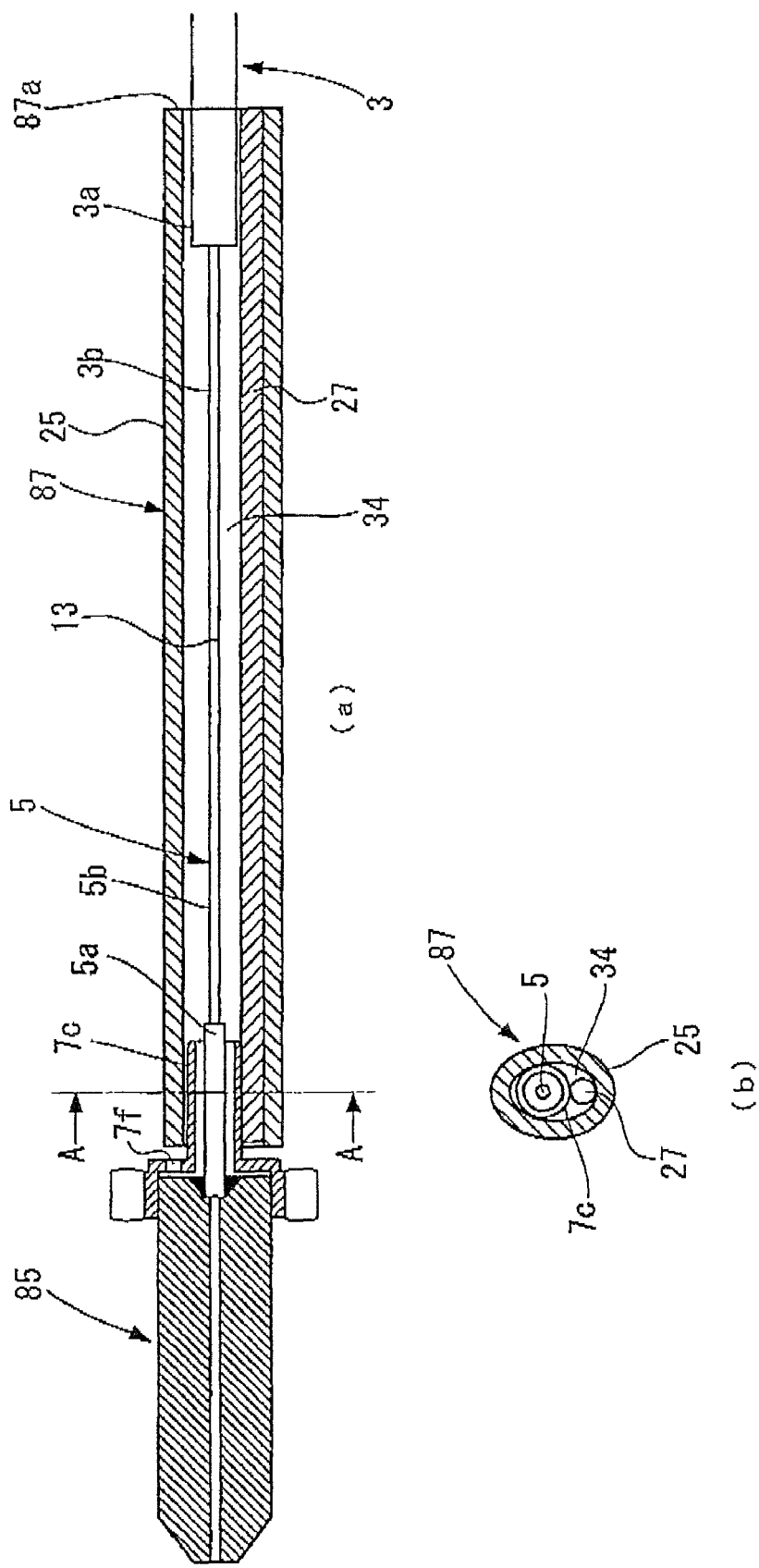
FIG. 6(a) is a longitudinal sectional view of the optical connector ferrule shown in FIG. 4.
FIG. 6(b) is a cross sectional view of the protection sleeve connected to the optical connector ferrule
Figure 7:
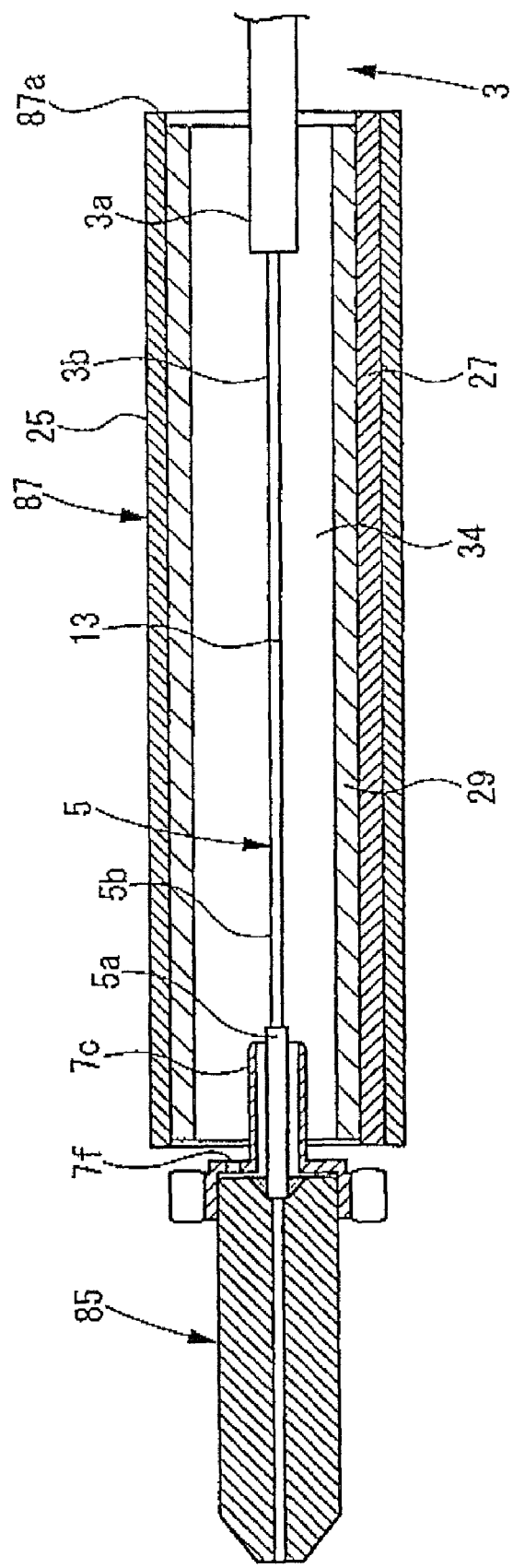
FIG. 7 is a longitudinal sectional view of the protection sleeve prior to the thermal shrinking process.

FIG. 6(a) is a longitudinal sectional view of the optical connector ferrule shown in FIG. 5 and the protection sleeve connected to this optical connector ferrule, FIG. 6(b) is a cross sectional view of the protection sleeve taken along an A-A line in FIG. 6(a), and FIG. 7 is a longitudinal sectional view of the protection sleeve prior to the thermal shrinking process. Here, in FIG. 7, in order to clarify the thermal shrinkage action, the protection sleeve 87 is illustrated in a slightly exaggerated manner with respect to the optical connector ferrule 85.

The fusion-spliced portion 13 is formed by butting the part 5b in which the coating 5a is stripped at the end portion of the short optical fiber 5, and a part 3b in which a coating 3a is stripped at the end portion of the coated optical fiber 3, and then fusion splicing the butted fiber end surfaces.

Here, the end surface of the short optical fiber 5 from which the coating 5a is stripped is mirror-finished previously by either a cleavage caused by applying a bending stress to the optical fiber or the polishing, and thus the mirror polishing on the spot can be omitted.

Also, it is preferable that the edge of the end surface of the short optical fiber 5 should be cut by the electric-discharge machining before the fusion splicing. This is because a chipping produced from the edge by the polishing can be prevented. Further, the short optical fiber 5 is conveyed to the spot in a state that the coating is removed from the fiber. Therefore, it is preferable that the carbon-coated fiber should be employed as the short optical fiber 5. This is because a reduction of strength caused due to scratches or moisture absorption can be suppressed. Also, it is preferable that the short optical fiber 5 should be formed of the fiber whose MFD is reduced and which is tough to the bending.

As shown in FIG. 6(b), the protection sleeve 87 has a thermal shrinkage tube 25, a stem 27 that is passed through the thermal shrinkage tube 25, and an adhesive tube 29 (see FIG. 7) through which the optical fiber is passed. The thermal shrinkage tube 25 is coupled onto the sleeve coupling projection 7c of the optical connector ferrule 85. The coated optical fiber 3 is fitted into the optical connector 1 in a state that the jacket 72 of the optical cord 70 is removed from the end portion by a predetermined length. The protection sleeve 87 covers the outer periphery of the coated optical fiber 3 on the other end side where the protection sleeve 87 is not coupled to the optical connector ferrule 85.

When the thermal shrinkage tube 25 is heated up to a predetermined temperature by the heating machine, this tube thermally shrinks and adheres closely to the inserted stem 27. Also, the thermal shrinkage tube 25 thermally shrinks to cause the stem 27 to contact tightly to the sleeve coupling projection 7c of the optical connector ferrule 85, and also adheres closely to the outer periphery of the coated optical fiber 3.

When both ends (parts that adhere closely to the optical connector ferrule 85 and the coated optical fiber 3 respectively) shrink quickly than the center portion in the axial direction while the thermal shrinkage tube 25 thermally shrinks, an air is confined in the protection sleeve 87 and the sleeve coupling projection 7c, and thus the bubbles are generated.

As described previously, one of characterizing structures of the present invention resides in that the air escape hole 7f is provided in the diameter-extended portion 7b of the optical connector ferrule 85. Accordingly, the remaining air in the sleeve can be escaped from the air escape hole 7f to the outside via the hole 7e in the sleeve coupling projection 7c and the concave portion in the diameter-extended portion 7b. Therefore, as shown in FIG. 5, the adhesive is not injected into the hole 7e in the sleeve coupling projection 7c, and the air flow path is intentionally ensured. As a result, the coating 5a is not stripped from the short optical fiber 5 that is kept in a non-adhered state, and the coating 5a still remains in the sleeve coupling projection 7c to keep the strength.

Figure 9:
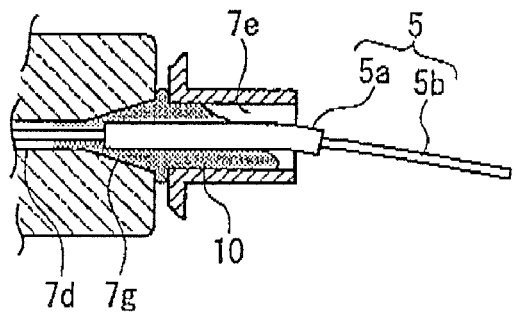
FIG. 9 is a longitudinal sectional view of the optical connector ferrule in which the adhesive is injected ununiformly.

Also, the reason why the adhesive is not injected into the hole 7e in the sleeve coupling projection 7c is given as follows. That is, when the injection of the adhesive is not strictly managed while, upon assembling the optical connector ferrule 85, the adhesive is filled into the hole 7e in the sleeve coupling projection 7c to hold the inserted short optical fiber 5, the ununiform injection of the adhesive causes a difference in a curing/shrinking force around the fiber. Thus, as shown in FIG. 9, the curing/shrinking force generated on the side where the more adhesive is injected becomes stronger than that generated on the side where the less adhesive is injected, and therefore the short optical fiber 5 leans to the inner wall side on which the more adhesive is injected in the internal space of the hole 7e. As a result, it is possible that a bend loss is caused in the short optical fiber 5.

Therefore, the characterizing structures of the present invention resides in that, as already described above, the short optical fiber 5 is held in the optical connector ferrule 85 by the adhesive 10 that is filled only in the optical fiber insertion hole 7d and the optical fiber guiding portion 7g of the optical connector ferrule 85. Accordingly, the short optical fiber 5 is never inclined in the internal space of the hole 7e, due to a difference in the curing/shrinking force of the adhesive. Also, even if the short optical fiber 5 is inclined to contact the inner wall surface of the hole 7e, the strength of the short optical fiber 5 can be still kept by the coating 5a.

Here, the adhesive tube 29 is softened by the heating that is applied in thermally shrinking the thermal shrinkage tube 25. This softened adhesive tube 29 serves as the adhesive that fills a clearance 34 between the thermal shrinkage tube 25 and the stem 27.

As shown in FIG. 7, the protection sleeve 87 positions the thermal shrinkage tube 25, the stem 27, and the adhesive tube 29 in a state that the end portion of the stem 27 and the end portion of the adhesive tube 29 are aligned in position with one end of the protection sleeve 87. Then, the protection sleeve 87 is fixed to the sleeve coupling projection 7c of the optical connector ferrule 85 in this positioned state.

Both end portions of the adhesive tube 29 and the stem 27 may be press-fitted or be deposited onto the optical connector ferrule 85 instead of the adhesion, and may be fixed integrally with this ferrule.

Respective length dimensions of the short optical fiber 5 and the thermal shrinkage tube 25, the stem 27, and the adhesive tube 29 of the protection sleeve 87 are set in such a way that, when the protection sleeve 87 is coupled to the sleeve coupling projection 7c on the base end of the optical connector ferrule 85, the fusion-spliced portion 13 is positioned just in the substantially middle position of the protection sleeve 87 in the length direction.

The protection sleeve 87 is moved to cover the fusion-spliced portion 13 after the short optical fiber 5 and the coated optical fiber 3 are fusion spliced together, and is brought into contact with the optical connector ferrule 85. Then, the heat is applied to the thermal shrinkage tube 25 such that the coated optical fiber 3 and the short optical fiber 5 are fixed in a state that these components are put longitudinally along the stem 27.

In this manner, dimensions of respective components are set in such a manner that, when the thermal shrinkage tube 25 is thermally shrunk, the end portion of the thermal shrinkage tube 25 overlaps with the coating 3a of the coated optical fiber 3 and the sleeve coupling projection 7c by 2 mm or more.

The rear housing 91 is a cylindrical structure that covers the periphery of the protection sleeve 87, and is formed of a resin in terms of the injection molding, or the like. The top end of the rear housing 91 constitutes a cylinder portion 91a that is fitted into the base end of the plug frame 83. Then, an engaging claw 91b that engages with an engaged hole 83a, which is cut on the outer periphery of the base end of the plug frame 83, when the cylinder portion 91a is fitted into the base end of the plug frame 83 is provided to the cylinder portion 91a.

The rear housing 91 is moved and put on the protection sleeve 87 after the protection sleeve 87 is subjected to the thermal shrinking process. Then, the rear housing 91 is coupled integrally to the plug frame 83 by engaging the engaging claw 91b on the top end side with the engaged hole 83a of the plug frame 83.

The SC connector knob 81 acting as the knob portion in connecting the connector is put on the outer periphery of the plug frame 83 to which the rear housing 91 is coupled, and fitted thereto. The SC connector knob 81 is an exterior component that provides an external appearance of the optical connector 1 on the top end side. A nonskid knurl 33a for facilitating the grasping of the knob is formed on both outer side surfaces of the SC connector knob 81.

The boot 95 protects the optical cord 70 such that a sharp bending is not acted to the optical cord 70 that is extended to the rear side of the rear housing 91. The boot 95 is coupled integrally to the rear housing 91 when its top end is fitted onto or screwed onto the base end of the rear housing 91.

In this case, the rear housing 91 may be formed integrally with the rear housing 91 by means of the resin injection molding.

A space 35 (see FIG. 3) for allowing the protection sleeve 87 to move back is formed between other end 87a (see FIG. 6) of the protection sleeve 87 and an inner wall end in the boot 95 opposing to this other end 87a.

In this case, as shown in FIG. 3(b), the boot 95 may be constructed such that a reinforcing tube 37 that is put on the optical cord 70 may be inserted into the backside of the inner wall end, and fitted thereon.

A disconnection preventing portion 37a whose diameter is extended is provided to the top end of the reinforcing tube 37. Because the disconnection preventing portion 37a engages with the inner wall end in the boot 95, a moving action of the reinforcing tube 37 is restricted. The reinforcing tube 37 is formed of a tube that has adequate elasticity, and prevents such an event that the optical cord 70 is bent sharply.

An orientation mark 97a is provided to the side surface of the diameter-extended portion 7b of the optical connector ferrule 85. In contrast, an orientation mark 97b and a sight recess 99 are provided to the sidewall of the plug frame 83. When the orientation mark 97b is aligned with the orientation mark 97a while checking the orientation mark 97a through the sight recess 99, the optical connector ferrule 85 can be fitted into the plug frame 83 in a normal attitude.

In the optical connector 1, the jacket 72 located on the end portion of the optical cord 70 is stripped largely. This is because the work in the fusion splice on site should be improved, upon fusion-splicing the short optical fiber 5 of the optical connector ferrule 85 and the coated optical fiber 3 that is exposed by removing the jacket 72 from the optical cord 70 on site. When the jacket 72 located on the end portion is stripped (removed) from the optical cord 70, the coated optical fiber 3 whose outer periphery is covered with a high tensile-strength fiber (Kevlar (registered trademark)) 74 is exposed.

The high tensile-strength fiber 74 and the jacket 72 are cut into a predetermined length, and are fitted into a rear end portion 91c of the rear housing 91. The caulking ring 93 is put on the outer periphery of the fitted jacket 72, and the caulking ring 93 is caulked in the diameter reducing direction. Since the diameter of the caulking ring 93 is decreased, the jacket 72 and the high tensile-strength fiber 74 are press-fitted into the caulking ring 93 and the rear end portion 91c, and are fixed to the rear housing 91.

Figure 8:
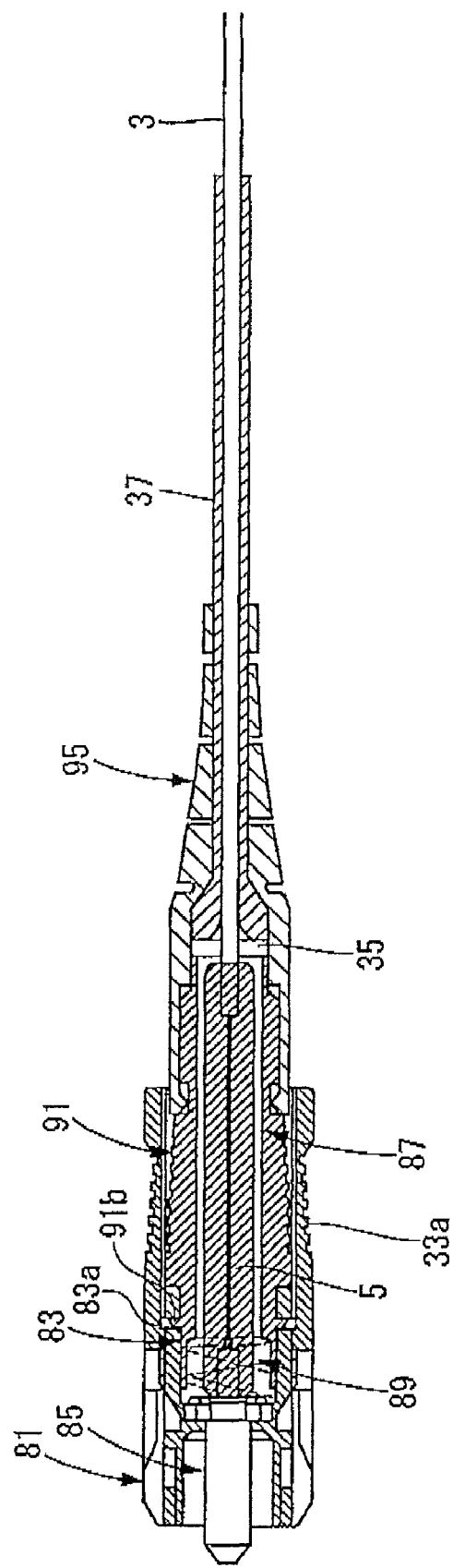
FIG. 8 is a longitudinal sectional view showing a structure of a variation in which the optical connector shown in FIG. 2 is applied to the coated fiber type.

FIG. 8 is a longitudinal sectional view showing a structure of a variation in which the optical connector shown in FIG. 2 is applied to the coated fiber type.

As already described above, the optical connector 1 according to the present embodiment can also be employed as the coated fiber type. In this case, except that a shape of the SC connector knob 81 is slightly different and that the caulking ring 93 used to fix the high tensile-strength fiber 74 and the jacket 72 is not needed, remaining components in this variation are similar to those in the above embodiment. Here, in FIG. 8, the reference numeral 37 denotes the reinforcing tube for the coated optical fiber 3.

According to the optical connector 1 explained in the above, one end of the protection sleeve 87 is coupled to the optical connector ferrule 85. Therefore, the positioning of the protection sleeve 87 is made precisely, irrespective of a degree of skill of the worker on site. As a result, an overlapped length between the end portion of the protection sleeve 87 and the coated portion of the coated optical fiber 3 can be reduced up to about 3 mm, and thus a length of the optical connector 1 can be made compact by reducing largely a length of the protection sleeve 87.

Therefore, on account of the compactification of the optical connector, the fittability of the optical connector 1 into the small-sized aerial closure, or the like can be improved.

Also, the protection sleeve 87 for covering the peripheries of the short optical fiber 5 and the fusion-spliced portion 13 is coupled to the optical connector ferrule 85. When the optical connector ferrule 85 comes into contact with the optical connector ferrule on the opposite side and moves back during connecting the connector, the protection sleeve 87 also moves back together with the optical connector ferrule 85. Hence, a large compressive load is never applied to the short optical fiber 5.

As a result, it can be prevented that a large bending load is applied to the short optical fiber 5 being fitted to the optical connector ferrule 85, at a time of the connector connecting work. Also, the problems of an increase of bend loss, a breakage, etc. of the optical fiber can be avoided.

Also, the optical connector 1 of the present embodiment is constructed such that the protection sleeve 87 includes the thermal shrinkage tube 25, and the stem 27 and the adhesive tube 29 both being passed through the thermal shrinkage tube 25, and also the protection sleeve 87 is coupled to the optical connector ferrule 85.

Then, one end of the protection sleeve 87 is coupled to the sleeve coupling projection 7c of the optical connector ferrule 85, and then the protection sleeve 87 can hold firmly the fusion-spliced portion 13 between the short optical fiber 5 and the coated optical fiber 3 on site in a state that these components are put longitudinally along the stem 27, when such a simple operation that the thermal shrinkage tube 25 provided on its outer periphery is thermally shrunk by the heating process using the heating machine is applied. As a result, the fusion-spliced portion 13 can be reinforced strongly with the protection sleeve 87.

In other words, the fusion-spliced portion 13 can be protected simply and firmly by the protection sleeve 87 even on the spot where it is difficult to get the working equipment, and the like ready.

Next, procedures of assembling the optical connector 1 having the above structure will be explained hereunder.

FIG. 10(a) to (e) are process charts explaining the procedures of assembling the optical connector shown in FIG. 2, FIG. 11(f) to (k) are process charts explaining the procedures of assembling the optical connector shown in FIG. 2, and FIG. 12(l) to (q) are process charts explaining the procedures of assembling the optical connector shown in FIG. 2.

Figure 10:
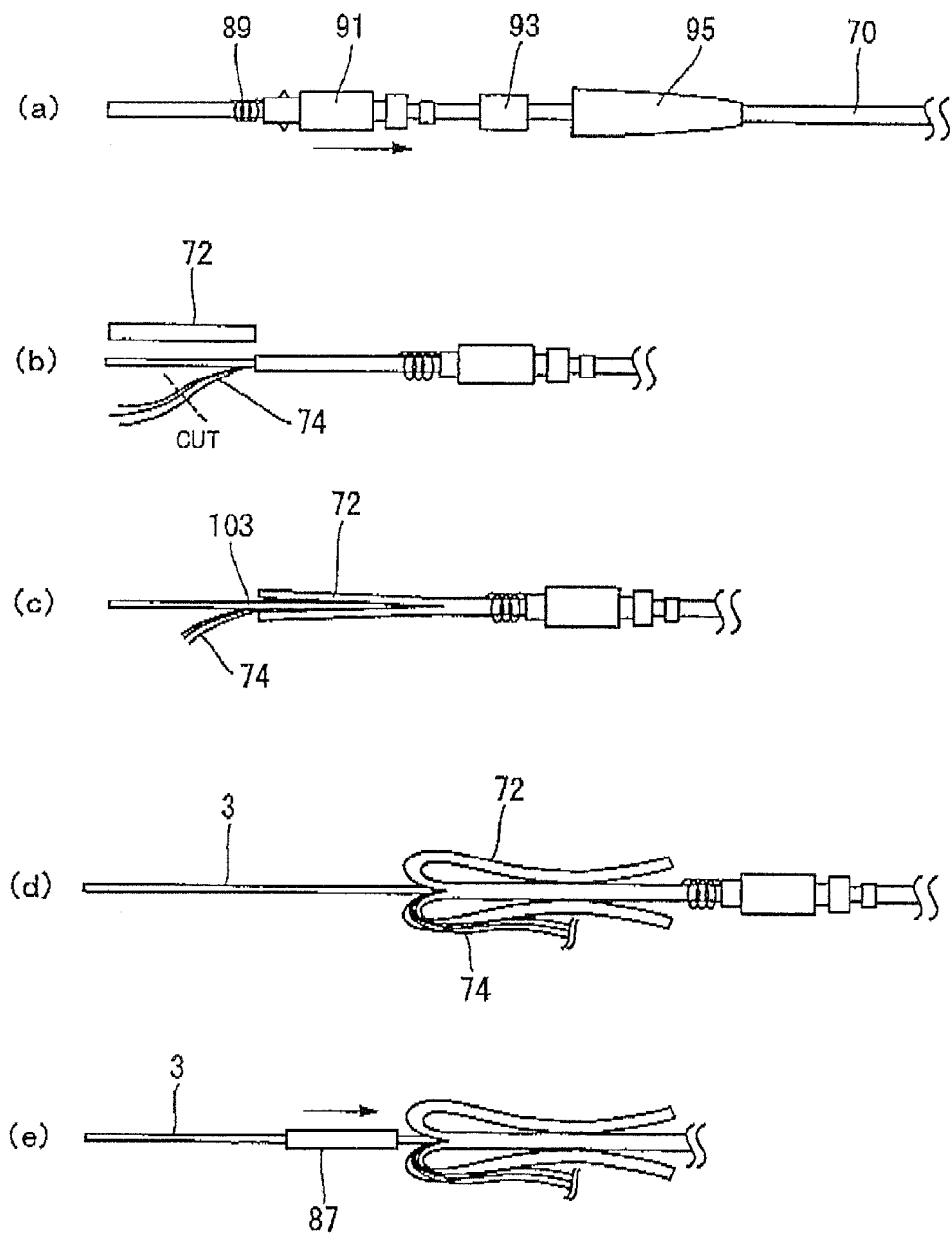
FIG. 10(a) to (e) are process charts explaining the procedures of assembling the optical connector shown in FIG. 2.

In assembling the optical connector 1, as shown in FIG. 10(a), first respective portions of the boot 95, the caulking ring 93, the rear housing 91, and the ferrule presser bar spring 89 are inserted in order into the end portion of the optical cord 70 on site.

Then, as shown in FIG. 10(b), the jacket 72 on the top end side of the optical cord 70 is removed, and the extra high tensile-strength fiber 74 is cut away. Then, as shown in FIG. 10(c), a slit 103 is made in the jacket 72 in the axial direction to cut up the jacket 72. Then, as shown in FIG. 10(d), the jacket 72 and the exposed high tensile-strength fiber 74 are tucked up not to be a hindrance in the later operations. Then, as shown in FIG. 10(e), the protection sleeve 87 is slipped onto the coated optical fiber 3.

Figure 11:
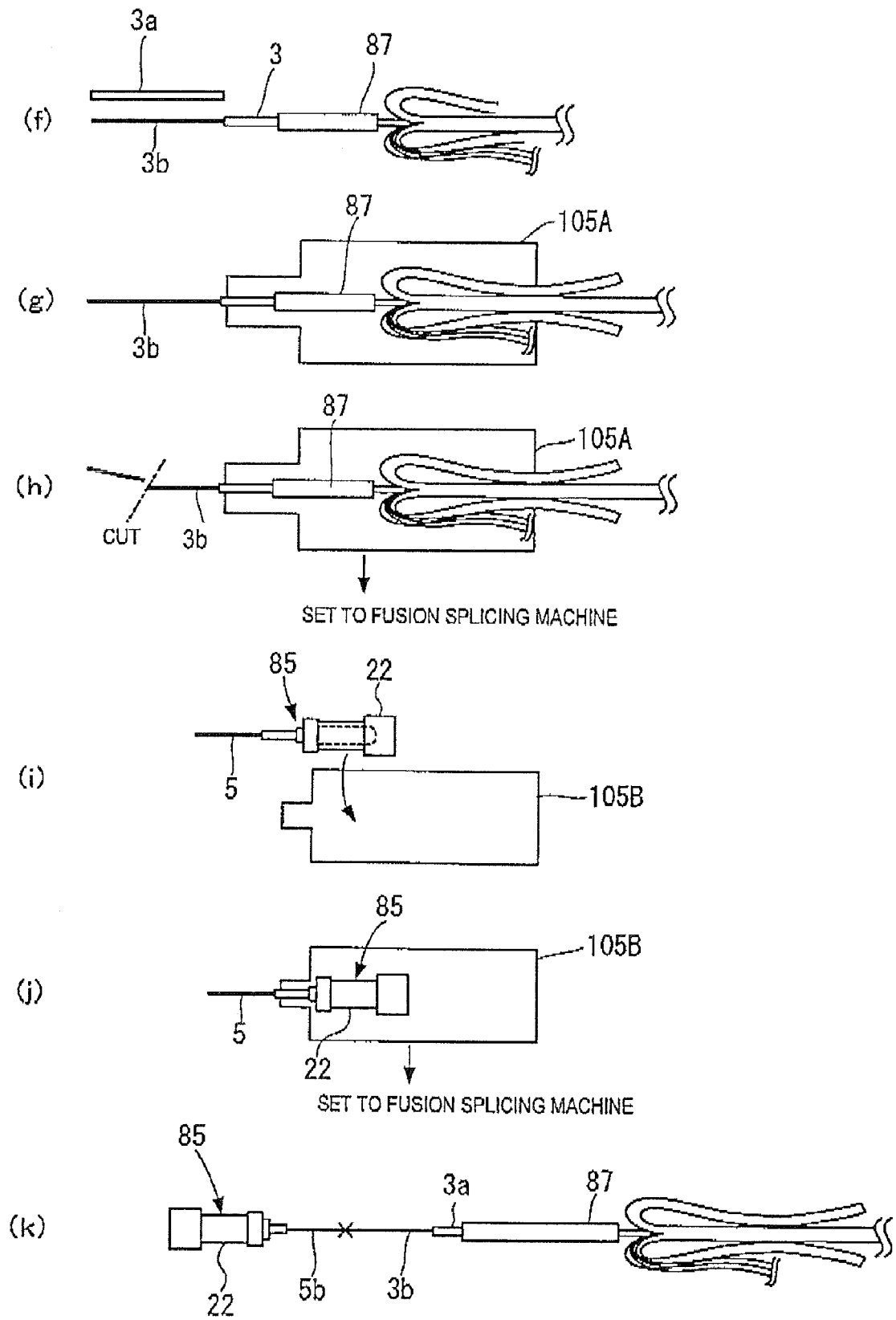
FIG. 11(f) to (k) are process charts explaining the procedures of assembling the optical connector shown in FIG. 2.

Then, as shown in FIG. 11(f), the coating 3a is stripped from the coated optical fiber 3, which is extended from the protection sleeve 87, to expose the glass fiber part 3b, and then the part 3b is cleaned. Then, as shown in FIG. 11(g), the protection sleeve 87 and the coated optical fiber 3 are set in a fusion fiber holder 105A. Then, as shown in FIG. 11(h), the glass fiber part 3b is mirror-cut into a predetermined length, and then the protection sleeve 87 and the coated optical fiber 3 are set in the fusion splicing machine (not shown).

Meanwhile, as shown in FIG. 11(i), the optical connector ferrule 85 in which the short optical fiber 5 is built is set in a ferrule holder 105B. Here, in FIG. 11(i), a reference numeral 22 denotes the dust cap. Then, as shown in FIG. 11(j), the ferrule holder 105B that holds the optical connector ferrule 85 is set in the fusion splicing machine (not shown). Then, as shown in FIG. 11(k), the part 3b, in which the coating 3a is stripped, of the coated optical fiber 3 and the part 5b, in which the coating 5a is stripped, of the short optical fiber 5 in the optical connector ferrule 85 are butted together, and these stripped parts are fusion spliced together by the fusion splicing machine.

Figure 12:
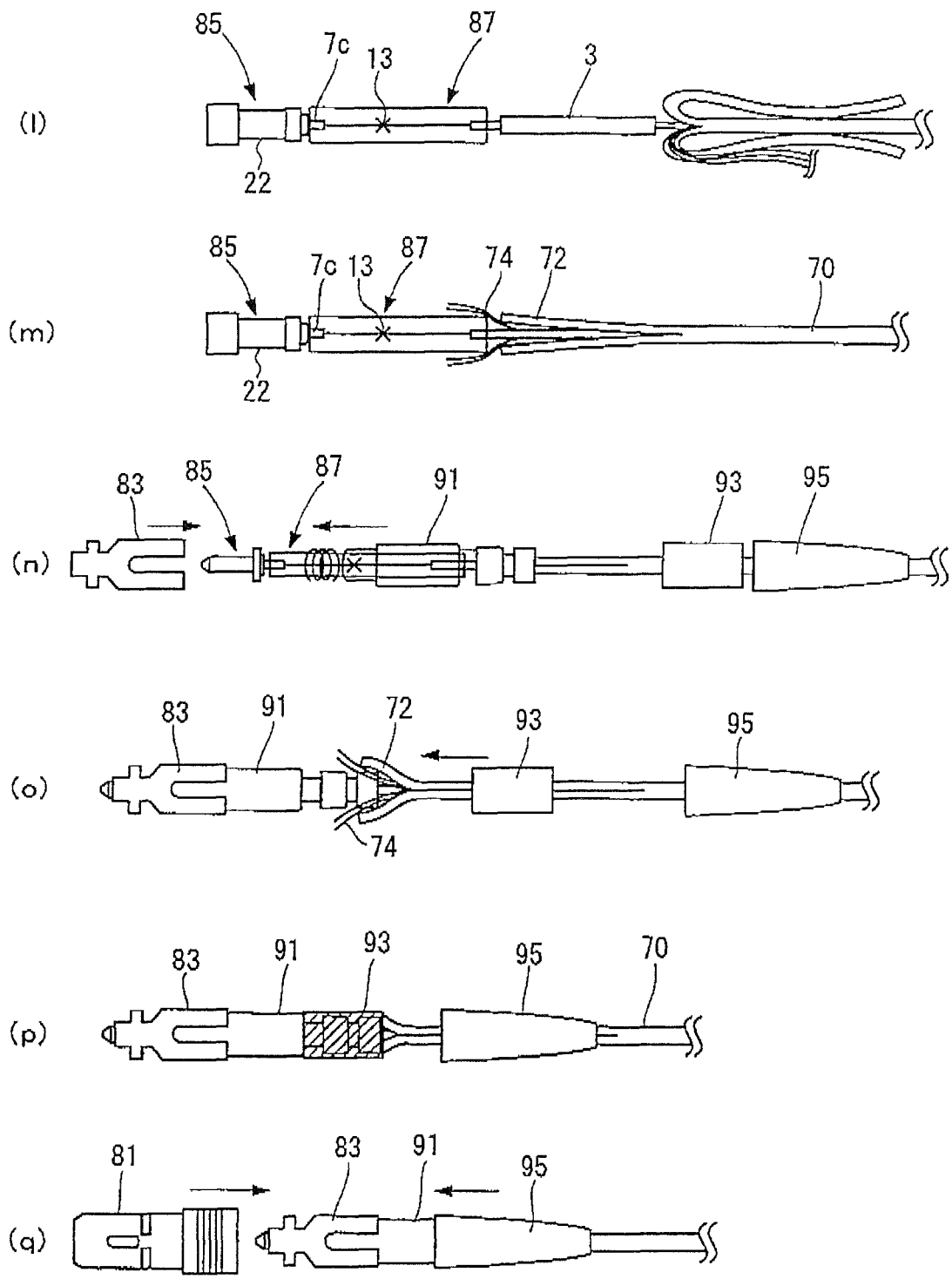
FIG. 12(l) to (q) are process charts explaining the procedures of assembling the optical connector shown in FIG. 2.
Figure 13:
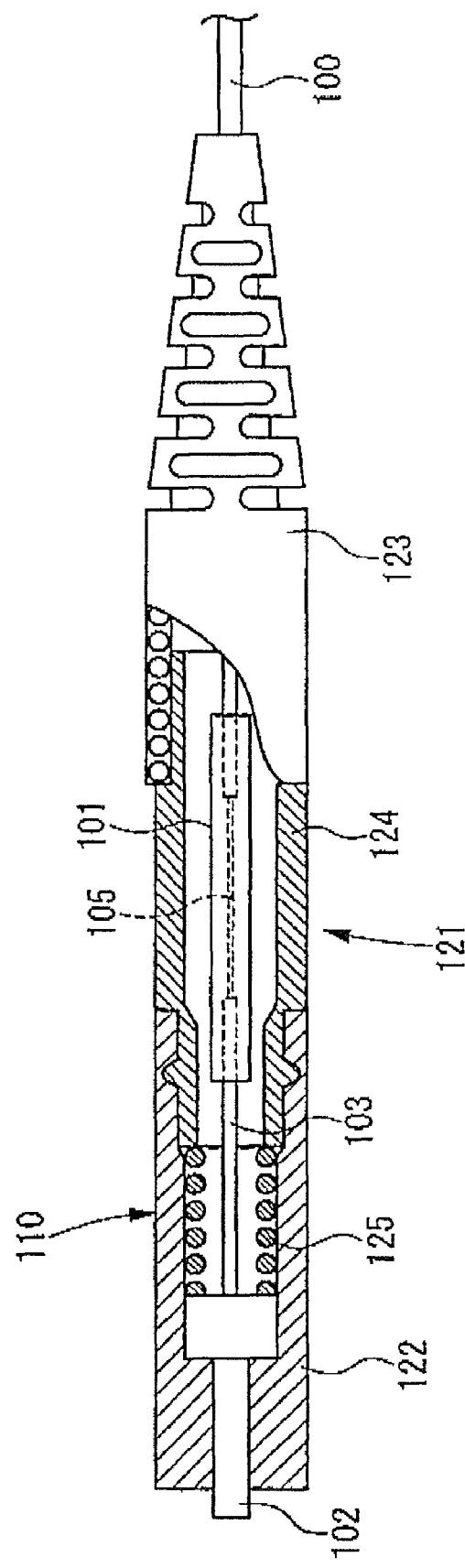
FIG. 13 is a view explaining a prior art structure that a short optical fiber that is fitted in advance to an optical connector ferrule, and a coated optical fiber are connected by the fusion splicing.
Figure 14:
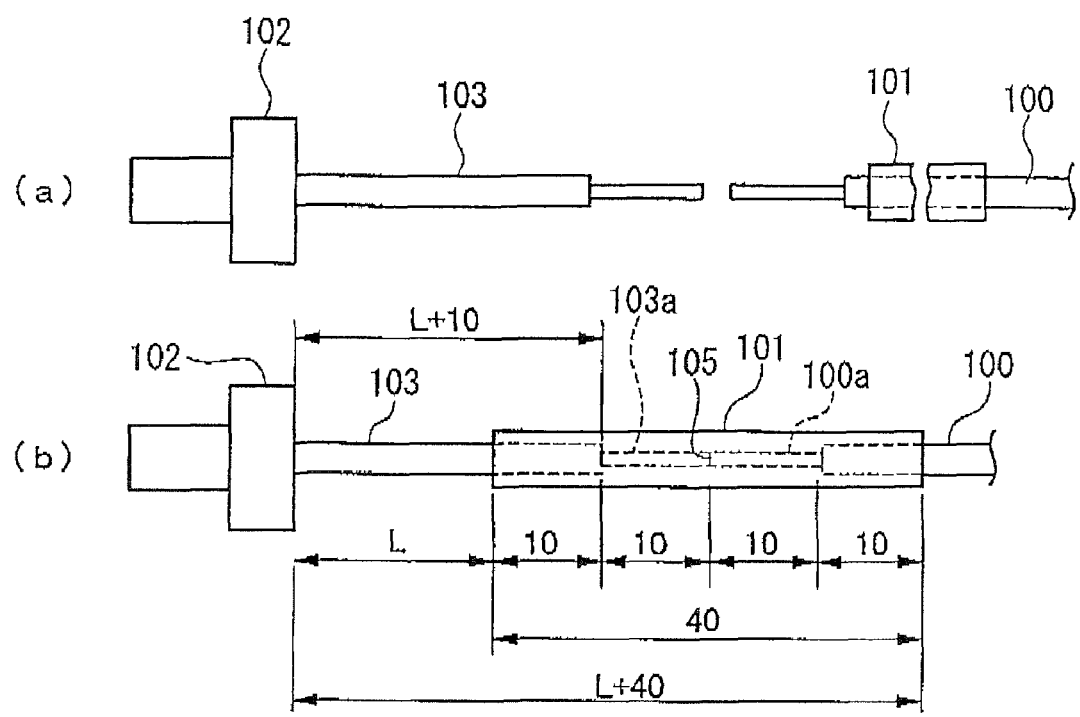
FIG. 14 is a view explaining a prior art optical connector.

Then, as shown in FIG. 12(l), the top end of the protection sleeve 87 is fitted onto the sleeve coupling projection 7c in the optical connector ferrule 85 to cover the fusion-spliced portion 13, and then the protection sleeve 87 is thermally shrunk. Then, as shown in FIG. 12(m), the tucked-up portions of the high tensile-strength fiber 74 and the jacket 72 are restored.

Then, as shown in FIG. 12(n), the dust cap 22 is removed from the optical connector ferrule 85, then the plug frame 83 is inserted from the top end side of the optical connector ferrule 85, and then the rear housing 91 is fitted into the plug frame 83 while holding the ferrule presser bar spring 89 therein. Then, as shown in FIG. 12(o), the high tensile-strength fiber 74 and the jacket 72 are put on the rear end portion 91c of the rear housing 91.

Then, as shown in FIG. 12(p), the caulking ring 93 is press-fitted, and the high tensile-strength fiber 74 and the jacket 72 are fixed to the rear end portion 91c. Finally, the SC connector knob 81 and the boot 95 are coupled to the plug frame 83 and the rear housing 91 respectively, and thus the assembly of the optical connector 1 is completed.

The present invention is explained in detail with reference to the particular embodiments as above. But it is apparent for those skilled in the art that various variations and modifications can be applied without departing from a spirit and a scope of the present invention.

This application is based upon Japanese Patent Application (Patent Application No. 2008-050009) filed on Feb. 29, 2008; the contents of which are incorporated herein by reference.

The invention claimed is:

1. An optical connector for housing and holding a fusion-spliced portion, in which a short optical fiber that is fitted to an optical connector ferrule and a coated optical fiber are fusion-spliced together, therein, wherein one end of a protection sleeve made of a thermal shrinkage material, which is slipped onto the short optical fiber and the coated optical fiber and covers a periphery of the fusion-spliced portion, is coupled to the optical connecter ferrule, and an air escape hole that is communicated with an inside of the protection sleeve is provided in the optical connector ferrule.

2. An optical connector according to claim 1, wherein a top end portion, in which a coating is stripped, of the short optical fiber is inserted into an optical fiber insertion hole of the optical connector ferule, and a boundary part between the top end portion and the coating is adhered and secured to the optical fiber insertion hole.

3. An optical connector according to claim 1, wherein the optical connector ferrule has a ferrule main body, a diameter extended portion which is coupled integrally to the ferrule main body, and a coupling projection which is joined to one end of the diameter-extended portion and onto which the protection sleeve is fitted, and the coating which is stripped from the top end portion and removed from the fusion-spliced portion of the short optical fiber is still left at least in the coupling projection.

4. An optical connector according to claim 2, wherein the optical connector ferrule has a ferrule main body, a diameter extended portion which is coupled integrally to the ferrule main body, and a coupling projection which is joined to one end of the diameter-extended portion and onto which the protection sleeve is fitted, and the coating which is stripped from the top end portion and removed from the fusion-spliced portion of the short optical fiber is still left at least in the coupling projection.

* * * * *